United States Patent
Huselton et al.

(10) Patent No.: US 10,536,524 B2
(45) Date of Patent: Jan. 14, 2020

(54) SYSTEMS AND METHODS FOR CONTENT ORIGIN ADMINISTRATION

(71) Applicant: Level 3 Communications, LLC, Broomfield, CO (US)

(72) Inventors: Jason Huselton, Erie, CO (US); William R. Power, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 120 days.

(21) Appl. No.: 15/900,394

(22) Filed: Feb. 20, 2018

(65) Prior Publication Data
US 2018/0241819 A1    Aug. 23, 2018

Related U.S. Application Data

(60) Provisional application No. 62/461,502, filed on Feb. 21, 2017.

(51) Int. Cl.
| | | |
|---|---|---|
| *G06F 15/173* | (2006.01) | |
| *H04L 29/08* | (2006.01) | |
| *G06F 16/27* | (2019.01) | |
| *G06F 16/14* | (2019.01) | |
| *G06F 16/182* | (2019.01) | |

(52) U.S. Cl.
CPC .......... *H04L 67/1097* (2013.01); *G06F 16/14* (2019.01); *G06F 16/182* (2019.01); *G06F 16/27* (2019.01); *H04L 67/20* (2013.01); *H04L 67/2804* (2013.01); *H04L 67/02* (2013.01)

(58) Field of Classification Search
CPC . H04L 67/1097; H04L 67/20; H04L 67/2804; H04L 67/02; G06F 16/27; G06F 16/182; G06F 16/14
See application file for complete search history.

(56) References Cited

U.S. PATENT DOCUMENTS

| | | |
|---|---|---|
| 7,092,977 B2 | 8/2006 | Leung et al. |
| 9,330,107 B1 | 5/2016 | Kesselman |
| 2012/0079578 A1* | 3/2012 | Dachiraju .......... H04N 21/2225 726/7 |
| 2014/0108474 A1 | 4/2014 | David et al. |
| 2014/0233740 A1* | 8/2014 | Niamut ................ H04L 9/3013 380/279 |
| 2014/0279896 A1 | 9/2014 | Branton et al. |

(Continued)

OTHER PUBLICATIONS

International Search Report and Written Opinion of the International Searching Authority, dated Apr. 18, 2018, Int'l Appl. No. PCT/US18/018784, Int'l Filing Date Feb. 20, 2018; 14 pgs.

(Continued)

*Primary Examiner* — Sm A Rahman (57) ABSTRACT

Methods and systems for storing and distributing content include executing storage rules against ingested content to determine in which of a plurality of storage systems to store the ingested content. A metadata collection that includes records corresponding to the stored content is maintained such that the content may be located by querying or otherwise searching the metadata collection. The metadata collection may be analyzed using various criteria to identify content to be migrated between different storage systems.

21 Claims, 4 Drawing Sheets

(56) References Cited

U.S. PATENT DOCUMENTS

2014/0280746 A1    9/2014   Johns
2015/0201225 A1*   7/2015   Yin .................. H04N 21/23439
                                                                         725/95

OTHER PUBLICATIONS

International Preliminary Report on Patentability, dated Aug. 27, 2019, Int'l Appl. No. PCT/US18/018784, Int'l Filing Date Feb. 20, 2018; 13 pgs.

* cited by examiner

SYSTEMS AND METHODS FOR CONTENT ORIGIN ADMINISTRATION

CROSS-REFERENCE TO RELATED APPLICATIONS

This application is related to and claims priority under 35 U.S.C. § 119(e) from U.S. Patent Application No. 62/461,502, filed Feb. 21, 2017 entitled "SYSTEMS AND METHODS FOR THIRD-PARTY CONTENT ORIGIN ADMINISTRATION," the entire contents of which is incorporated herein by reference for all purposes.

TECHNICAL FIELD

Aspects of the present disclosure involve content storage and distribution, and more particularly involve optimizing content storage and delivery by storage systems that host content available through a content distribution network.

BACKGROUND

Content distribution networks (CDNs) generally function by retrieving and distributing content from content providers. When content first becomes available, it is often stored at an origin server hosting the content to be distributed. Once retrieved from the origin, the content can be cached at various locations within the CDN to facilitate efficient distribution of the content.

Historically, CDN operators handle both the ingestion of content from content providers and the operation and management of the origin servers hosting the content for distribution across the CDN. However, as storage and distribution services from third-party providers, such as cloud-based storage solution providers, proliferate, such third-party options are becoming increasingly favorable from both an economic and performance perspective. Moreover, the availability of multiple storage solutions gives CDN operators the opportunity to select from multiple storage solutions based on specific needs associated with particular pieces of content. Nevertheless, management of content across multiple storage systems, such as storage systems administered and maintained by third-parties, remains a significant barrier to widespread use of cloud-based storage solutions for content storage and distribution.

It is with these observations in mind, among others, that aspects of the present disclosure were conceived.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

This patent application involves, among other things, leveraging multiple storage systems to facilitate storage and distribution of content in a content distribution network (CDN). Rather than a CDN operator performing each of ingestion and storage of content received from a content provider, systems and methods described herein permit outsourcing of content storage while maintaining integrity of the overall storage platform.

In implementations of the present disclosure, content to be stored and distributed over the CDN is received from a content provider at an ingest server in communication with each of the CDN and a plurality of storage systems. Upon receiving the content, the ingest server applies storage rules to the content and, based on the result of the applied storage rules, identifies one or more storage systems on which to store the content. The storage system subsequently functions as an origin of the content and, as such, stores an original version of the content from which copies of the content may be made for distribution over the CDN. The storage rules include criteria and tests that may be applied by the ingest server and that may be defined by a party through a computing device in communication with the ingest server. For example, one or more of the content provider, an operator of the primary network, and an operator of a storage system may define some or all of the storage rules. The storage rules may be adapted to consider various parameters including, without limitation, the size of the content being store, the type of content being stored, performance characteristics of the candidate storage systems, costs associated with the candidate storage systems, contract and licensing terms with respect to the storage systems and/or the content itself, and the frequency with which the content is requested.

During ingestion of the content, a metadata record is generated in a metadata collection. The metadata record generally includes an object identifier unique to the content and a storage identifier corresponding to a location where the content is stored. Metadata records may further include additional data regarding the received content, the content provider associated with the data, the storage system on which the content is stored, access and distribution of the content, and any other aspects of the content, its storage, and its use.

During operation, a CDN server receives a request for stored content from a client device. The CDN server may first determine whether a cached version of the requested content is available on the CDN and, if so, may return an address to the location of the cached content to the client device. If, on the other hand, the CDN server determines that the content is not currently cached within the CDN, the content is retrieved from an origin server coupled to the CDN or one of the storage systems on which an original version of the content is stored. In certain implementations, retrieval of the content from an origin server or storage system includes executing a query or similar lookup in the metadata collection for the metadata record corresponding to the requested content. For example, the CDN server may execute a query including an object identifier of the stored content as received in the content request. The CDN server may then identify the location of the stored content from the returned metadata record, copy the content from the corresponding origin server or storage platform, and store the copied content within the CDN, such as at an edge server of the CDN from which the content may then be served.

In certain implementations, the metadata store is analyzed to determine whether content should be migrated between storage systems. For example, an operator computing device may be configured to apply the storage rules to the metadata store to identify content that should be migrated from a current storage system to a new storage system. In response to identifying such content, the operator computing device may initiate migration by issuing one or more commands to migrate the content from the first storage system to the second storage system and to delete the content from the first storage system. For example, the operator computing device may issue a first command to the first storage system to copy the content to the second storage system and delete the content from the first storage system. After the operator computing device may Following such migration, the operator computing device may update the metadata store to reflect the new location of the content, such as by modifying the existing record corresponding to the content or deleting the existing record and generating a new record.

By applying storage rules to content, whether during ingestion or as part of ongoing storage maintenance and administration, content can be stored in an available storage system most suitable for the content based on the nature of the content, the business needs of the content provider, the performance characteristics of the CDN, and may other performance, financial, and business-related considerations related to storing and provisioning the content. For example, content identified as being in high demand may be routed for storage in a high-speed storage system. In contrast, infrequently accessed content may be identified and stored in slower but lower cost storage systems. As a result, CDN operators are able to create a tiered storage system that optimizes content storage and retrieval. Moreover, systems and methods according to the present disclosure further permit migration of content across multiple storage systems over time as storage needs for particular content change. For example, content may be gradually migrated to relatively slower, more cost effective storage systems if and when access frequency for the content wanes.

Storage and migration of content between storage platforms also provides significant technical benefits. Among other things, by ensuring that content is stored on a storage platform with performance characteristics commensurate with the nature of the demand for the content being stored, CDN operators are able to better utilize their network resources. For example, low utilization content may be sent to storage platforms that, while relatively lower in performance, may be more energy efficient to operate than other, higher performance storage platforms. Similarly, to the extent a CDN operator has limited computational resources, low utilization content may be stored and/or migrated to slower or less computationally intensive storage platforms such that a greater proportion of computational resources are reserved for more critical tasks, such as for delivering higher demand content. Storage rules may also be applied to content in order to more efficiently consume network bandwidth. For example, a CDN may include multiple subnetworks, each of which may have different performance characteristics. Accordingly, to the extent content has relatively low demand, such content may be migrated to a storage platform communicatively coupled to a relatively slow subnetwork such that high performance network capacity is substantially reserved for higher demand content. Notably, the storage rules of the foregoing examples may also be inverted such that high demand content is stored or migrated to storage platforms that make use of premium network resources, thereby enabling more efficient use of lower performance storage platforms for less frequently accessed content. In yet another example benefit, content delivery speed and efficiency can be significantly improved by ensuring that content is located on storage platforms in geographic proximity to areas of high demand for that content.

Figure 1:
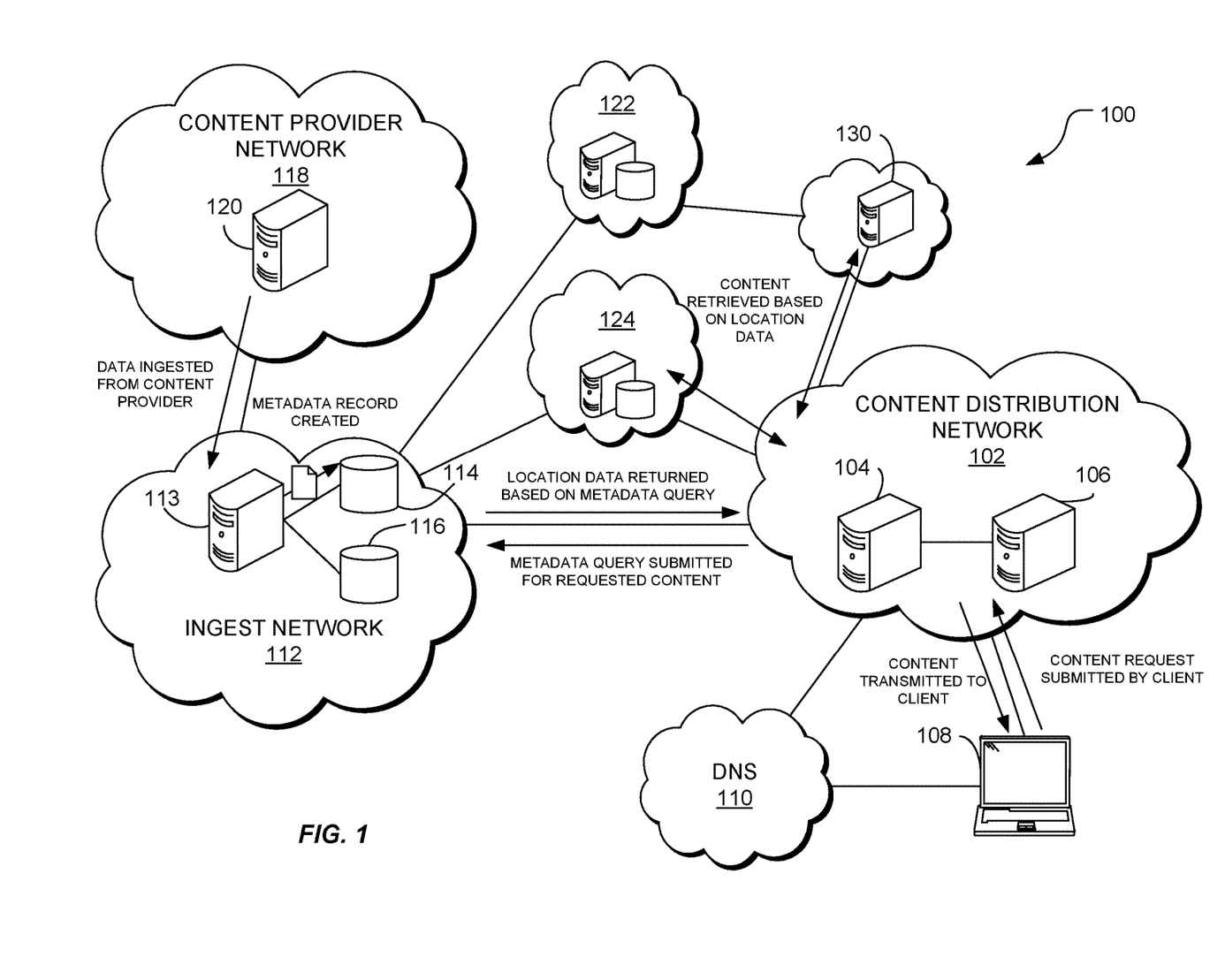
FIG. 1 is a schematic illustration of an example network environment for storing and distributing content to one or more users.

FIG. 1 is a schematic illustration of an example network environment 100 for storing and distributing content according to the present disclosure. In one implementation, a CDN 102 includes a first CDN device 104 and a second CDN device 106. The first CDN device 104 and the second CDN device 106 include, without limitation, CDN content distribution servers, such as CDN edge servers. The network environment 100 further includes an ingest network 112 in communication with a content provider network 118. The ingest network 112 includes an ingest server 113 in communication with a metadata store 114 and a primary network data storage 116. The content provider network 118 includes a content provider computing device 120. In certain implementations, the ingest network 112 may be part of or otherwise in communication with the CDN 102 and may be operated by an operator of the CDN 102.

The ingest network 112 is in communication with a plurality of storage systems. For example, in the network environment 100, the primary network 112 is in communication with a first storage system 122 and a second storage system 124. In certain implementations, the first storage system 122 and the second storage system 124 may be cloud-based storage solutions configured to store and make content received from the ingest network 112 available to the CDN 102. For example, the first storage system 122 and the second storage system 124 may function as cloud-based origin servers for content provided over the CDN 102.

In certain implementations, the first storage system 122 and the second storage system 124 may be different storage platforms offered by one or more storage providers. For example, the first storage system 122 and the second storage system 124 may correspond to different storage options of a tiered storage solution. In such a tiered system, the first storage system 122 may correspond to an expensive, high-speed storage platform suited for frequent access while the second storage system may correspond to a less expensive but slower storage system that provides a primarily archival function. Alternatively, the first storage system 122 and the second storage system 124 may correspond to distinct storage services, such as storage services offered by different storage providers. The first storage system 122 and the second storage system 124 may also correspond to geographically diverse storage systems that are suited for serving content to specific geographic regions.

During operation, a content provider associated with the content provider network 118 provides content to the ingest network 112 for storage and distribution through the CDN 102. To do so, the content provider transfers content stored on the content provider computing device 120 to the ingest server 113. When the ingest server 113 receives content from the content provider network 118, the ingest server 113 applies one or more storage rules to determine how to store the content received from the content provider network 118.

Based on the result of the storage rules, the ingest server 113 selects a storage system on which to store the received content. In the network environment 100, for example, the ingest server 113 selects one or more of the first storage system 122, the second storage system 124, and a primary network storage system 116 on which the received content is to be stored. Although shown in FIG. 1 as being separate from but in communication with the CDN 102, the ingest network 112 may also be incorporated into the CDN 102 and/or operated in conjunction with the CDN 102.

As discussed herein, the rules applied during ingestion of new content are logical tests that, when applied to data representing characteristics and parameters of the content provider, the content itself, or the storage systems available for storing the content, identify one of the storage systems 116, 122, 124, on which the content is to be stored. So, for example, during ingestion of new content, the ingest server 113 may analyze the content to be stored to obtain data corresponding to characteristics of the data. The ingest server 113 may also be in communication with one or more other data sources for storing data related to the content provider and storage systems available for storage of the content and ingestion of new content may further include retrieving relevant data from such data sources. In certain implementations, the rules may also be applied to content already stored on one of the storage systems 116, 122, 124 to migrate content between storage systems and may further include retrieving data corresponding to the content maintained in the metadata store 114. In either of the initial ingestion and migration case, application of the rules to the relevant data results in the identification of a storage system on which the content is to be stored.

The specific characteristics and parameters that form the basis of the rules applied during ingestion or migration may vary and are not limited to any specific examples provided herein. Generally, however, any characteristic or parameter of, among other things, the content, content provider, or available storage systems for which data is available may be used as the basis of a rule for identifying a storage system on which to store content. In addition to other examples mentioned herein, non-limiting examples of such characteristics and parameters include the size of the content, the type of the content, the frequency with which the content has been requested over a certain time period; the frequency with which the content is modified or updated, the age of the content, preferences of the content provider, terms of a first service agreement between the content provider and an operator of the CDN 102 for making the content available over the CDN 102, terms of service agreements between the operator of the CDN 102 and third-party operators of the storage systems for storing content on the storage systems, the speed at which content is to be retrieved after storage, costs for storing the content, and security measures applied to the content once stored.

As part of storing the received content, the ingest server 113 generates a corresponding metadata record in the metadata store 114. The metadata record generally includes data corresponding to the received content and may further include data corresponding to the content provider from which the content was received, the storage system on which the content is stored, access of the content by the CDN 102, and other data related to the content. For example, the metadata record may include, without limitation, one or more of: a unique object identifier assigned to the content, a filename, a size, a bit rate, a checksum or other error checking parameter, a reference indicating one or more applied storage rules, a storage system indicator, a storage site description, a geographic location of the storage site, a content provider identifier, a timestamp corresponding to the creation date of the content, a timestamp corresponding to receipt of the content, a timestamp corresponding to the most recent request for the content, a timestamp corresponding to the most recent update or modification to the content, a storage cost, and a reference to applicable service level agreements or contract terms.

The one or more storage rules may applied by the ingest server 113 to content received from the content provider computing device 120 to determine on which of the plurality of available storage systems to store the content. The storage rules may be provided by various entities including, without limitation, one or more of the content provider, an operator of the primary network 112, an operator of the CDN 102, and one or more operators of the storage systems on which the content may be stored. Storage rules may consider various parameters including, without limitation, one or more of content type, storage system performance, storage system cost, contract and licensing terms with a storage system provider and/or content provider, actual or anticipated frequency of requests for the content, age of the content, storage system security capabilities (e.g., encryption), legal and regulatory requirements, and frequency at which the content is updated or otherwise modified. In certain implementations, the one or more storage rules may be applied directly to the metadata store 114. Alternatively, relevant metadata records may first be retrieved and the one or more storage rules may then be applied to the retrieved metadata records.

In certain implementations, the storage rules may dictate that received content is to be stored in more than one storage system. For example, a storage rule corresponding to international licensing and distribution may require content to be stored in each of a first storage system for serving the content in a first country and a second storage system for serving the content in a second country. As another example, a storage rule may dictate that content be stored in different storage systems such that one storage system is used as primary data storage and a second storage system is used as redundant or backup storage. The storage rules may also dictate that content be partitioned or distributed among multiple storage systems. For example, some content may be stored as a collection of transport segments and the storage rules may dictate that the transport segments be divided among different storage systems. In certain implementations, content may include both transport segments and a manifest file that dictates the order in which the transport segments are to be retrieved. Because the manifest file may be frequently updated or modified, such as during live-streaming of content, the transport segments may be stored in a first storage system directed to relatively permanent storage while the manifest file may be stored in a second storage system amenable to frequent updating.

The CDN 102 is communicatively coupled to one or more client devices 108 and a directory server, such as a Domain Name System (DNS) server 110. The CDN 102 is capable of providing content to the client device 108, which is generally any form of computing device, including, without limitation, a personal computer, mobile device, tablet (e.g., iPad™), and a smart phone. Content may include, without limitation, videos, multimedia, images, audio files, text, documents, software, and other electronic resources. The client device 108 is configured to request, receive, process, and present content received from the CDN 102.

In one implementation, one or more of the first CDN device 104 and the second CDN device 106 retrieves a copy of the requested content from an origin, such as one of the first storage system 122, the second storage system 124, the ingest network storage system 116, and a media access server (MAS) (e.g., a content distribution server or a content origin server of a content provider network) in response to a request for the content received from the client device 108. In such implementations, retrieval of a copy of the stored content may be performed by a CDN device of the CDN 102 querying the metadata store 114 to determine the location of the requested content. For example, in one implementation, a CDN device requests a metadata record based on an object identifier assigned to the requested content. The metadata record, which may include the storage system identifier, storage system location, storage system address, or other data corresponding to the location of the requested content, may then be used by the CDN device to access and retrieve a copy of the requested content.

In certain implementations, one or both of the first CDN device 104 and the second CDN device 106 may be edge servers and may cache content copied from storage systems, such as the first storage system 122, the second storage system 124, and the ingest network storage system 116. By caching content and serving the cached content, edge servers may reduce network loads, free capacity, lower delivery costs, and/or reduce content download time as compared to systems in which content is always retrieved from a remote storage system, such as the first and second storage systems 122, 124.

The first CDN device 104 and the second CDN device 106 may be configured to provide requested content to a requestor, such as the client device 108, via an intermediate device. For example, the client device 108 may communicate with the CDN 102 through an intermediate server or similar computing device that couples the client device 108 or a local network associated with the client device 108 to the CDN 102.

Certain storage systems may be accessed through a web server. For example, in the network environment 100, the CDN 102 is communicatively coupled to the first storage system 122 through an intermediate web server 130. The web server 130 may execute a service or similar application that may be adapted to receive requests for content from one or more computing devices of the CDN 102 and to provide the requested content to the requesting device. For example, to retrieve content from the first storage system 122, one or more application program interfaces (APIs) or similar interfaces may be used to facilitate communication and access between the CDN 102 and the first storage platform 122. More specifically, the web server 130 may receive a request for content from a computing device of the CDN 102, perform a lookup in the metadata store 114 for a corresponding metadata record, and begin transfer or otherwise facilitate copying of the content from a location indicated in the metadata record (e.g., one of the storage systems 122, 124) to the CDN 102. In certain implementations, communication between the ingest server 113 and the storage systems 122, 124 may also be facilitated using a web server or similar service and a corresponding API. For example, the process of storing content may include the ingest server 113 issuing a put or similar storage command to the storage system on which the content is to be stored. In addition to commands for storing content, the ingest server 113 may also issue commands pertaining to other operations including, without limitation, copying content, deleting content, moving content, and the like.

Although the first CDN device 104 and the second CDN device 106 are shown as directly coupled to client device 108, it should be appreciated that additional components may be disposed between the client device 108 and either of the first CDN device 104 and the second CDN device 106, including intermediate networks components and/or networks. In other words, the content requested and provided to the client device 108 may take many routes through the CDN 102 and its components depending on which content network device is tasked with providing requested content. Thus, although this particular disclosure utilizes the example of providing the content to the client device 108 directly over the CDN 102 from the first CDN device 104 and the second CDN device 106, any number of intermediate devices, networks, and connections to the CDN 102 may be utilized to deliver the requested content.

In one implementation, the client device 108 includes an Internet browser application with which a link (e.g., a hyperlink) to content may be selected or otherwise entered, causing a request to be sent from the client device 108 to the DNS server 110. For example, a user may wish to stream a movie on a computer or any other number of possible user devices, as described herein. To start the movie, a link to the movie in a website or other interface may be selected. In some instances, the user may select a graphic of the movie, and that graphic is associated with the link that begins the process of obtaining the movie data from the CDN 102. Selection of the link in some form causes a request to be sent to the DNS server 110. The DNS server 110 responds to the request by providing an address (e.g., an IP address) where the resource associated with the selected link can be obtained. For example, in certain implementations, the DNS server 110 resolves an alphanumeric domain name to an IP address. More specifically, the DNS server 110 resolves the link name (e.g., URL or other identifier) to an associated network address from which the client device 108 can retrieve the requested resource.

In certain implementations, the process of resolving a domain name may include use of both the DNS server 110 and an authoritative DNS name server of the CDN 102. For example, the DNS server 110 may identify requests for content provided by the CDN 102 and forward such requests to the authoritative DNS name server. The authoritative DNS name server may then perform an analysis to determine from which of a plurality of edge servers the content is to be served to the client device 108. Such an analysis may select an edge server based on various parameters including, without limitation, geographic proximity to the DNS server 110 or client device 108, network load, and network topology. The authoritative DNS name server may then return an IP address for a specific edge server of the CDN 102 from which the client device 108 may retrieve the requested content.

Retrieval of content from the CDN 102 may result in an update of the corresponding metadata record contained in the metadata store 114. For example, in response to providing content to the client device 108, one or more of a counter for tracking the number of times the content has been requested and a timestamp indicating the date/time of the most recent request of the corresponding metadata record may be updated. Other data that may be updated or otherwise added to a metadata record corresponding to content may also include, without limitation, one or more of an identifier associated with a DNS server from which a request for content was received, an IP address of a client device, an identifier associated with the client device, and an identifier associated with an edge server of the CDN 102 to which the content was copied.

Content stored in storage systems of the network environment 100 may be migrated between storage systems. In certain implementations, migration may include applying one or more of the storage rules to the records of the metadata store 114 to determine whether content should be moved between storage systems. For example, storage rules corresponding to the frequency with which content is requested may be executed against the metadata store 114 to identify infrequently accessed content that may be migrated to slower, lower cost storage system as compared to the storage system in which it is presently stored. In another example, storage rules regarding terms and durations of licensing agreements may be executed against the metadata store 114 to identify content that may be out of license. Such content may then be moved to a low-cost backup storage system until the corresponding license is renewed. Storage rules may be executed against the metadata store 114 manually, e.g., in response to a request from an operator of the ingest network 112, the content provider, or the CDN 102, or may be automated such that storage rules are run against the metadata store 114 periodically, for example, as part of an automated maintenance and administration routine. Following migration of content between storage systems, the metadata store 114 is updated to reflect the migration. Such updating may include modifying the existing record of the metadata store 114 corresponding to the migrated content or may include deleting the existing record from the metadata store 114 and generating a new record for the content.

In certain implementations, the metadata store 114 is accessible using a computing device associated with a content provider or other third-party. For example, a computing device associated with the ingest network 112 may provide a web portal or web service through which metadata records may be accessed that correspond to content of the content provider. The web portal, web service, or an application executed on the computing device may then be used to analyze the metadata. Such analysis may include, among other things, executing queries against the retrieved metadata, calculating statistical content metrics, generating graphs or other visualizations of the data, or using the metadata (or data derived from the metadata) to generate inputs for content management processes or business decisions. For example, an application may analyze the metadata to identify content based on access frequency, content age, or any other criteria specified by the content provider. To the extent content is identified that meets such criteria, transfer of the content between storage systems may be initiated. In one implementation, infrequently accessed or old content may be migrated to a slower, lower cost storage system while content experiencing increased access may be migrated to a faster storage system to better service the increased demand. In certain implementations, the application may be configured to generate a report, an alert, or similar notification including recommendations for migration that may then be manually confirmed and initiated by an operator. Alternatively, the application may be adapted to automatically initiate migration of content in response to identifying content that meets the previously discussed criteria.

Figure 2:
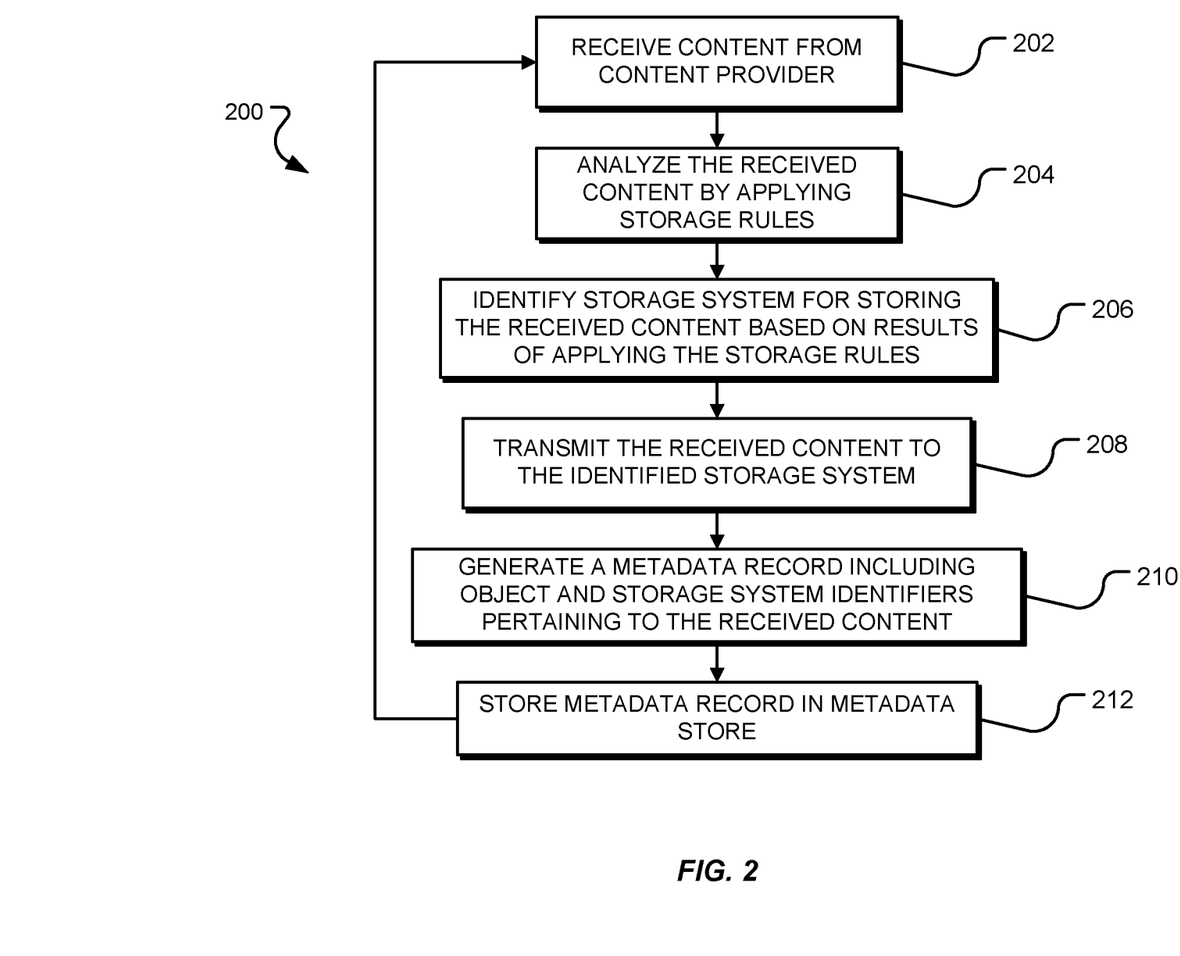
FIG. 2 is a flowchart of a method, or combination of methods, for storing content for use in a content distribution network.
Figure 4:
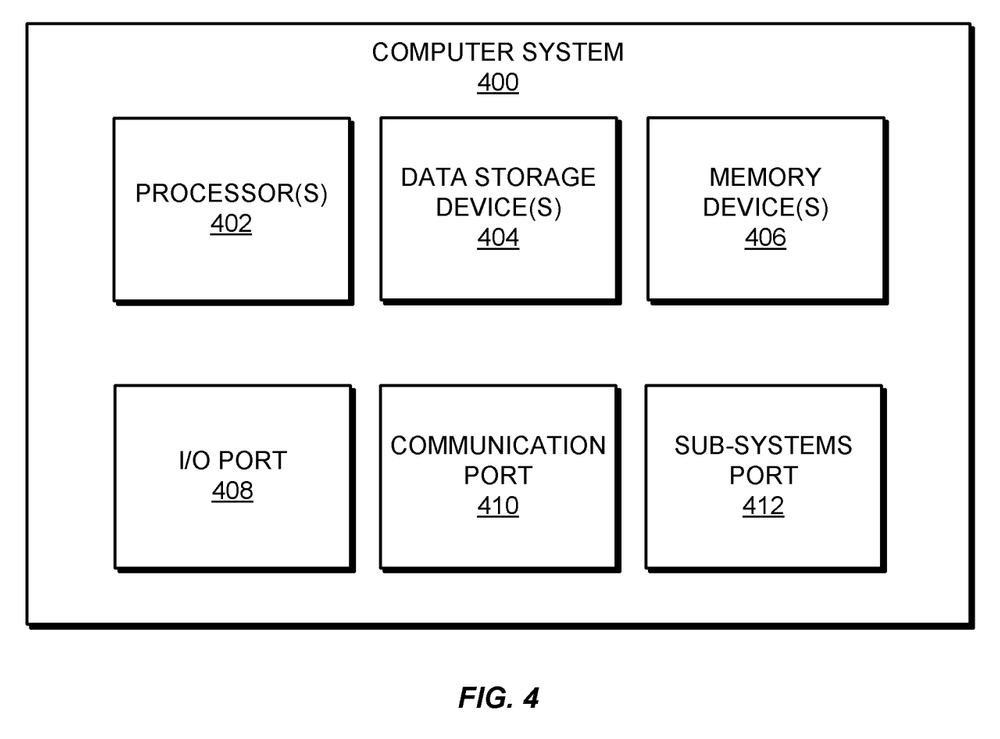
FIG. 4 is an example computing system that may implement various systems and methods of the presently disclosed technology.

FIG. 2 is a flowchart illustrating a method 200, or combination of methods, for storing content including various operations that may be performed by one or more computing systems, such as the computer system 400 shown in FIG. 4. Referring to the system 100 of FIG. 1, method 200 generally relates to the ingestion of content from the content provider 120 by the ingest server 113 and the corresponding generation of a metadata record corresponding to the received content and its storage in the metadata store 114.

The method 200 includes receiving the content from the content provider 120 (operation 202) and analyzing the received content by applying one or more storage rules to the content (operation 204). The storage rules are generally criteria and tests that are applied by the ingest server 113 to content received from the content provider 120. Based on the application of the storage rules, the ingest server 113 identifies a storage system for storing the received content (operation 206), such as one of the first storage system 122 and the second storage system 124 shown in FIG. 1. The content is then transmitted to the identified storage system (operation 208).

Storage rules may be based on various parameters including, without limitation, content type, network performance, cost, contract and licensing terms, and frequency of access requests for the content. Various storage platforms may be available to store content, each of which may have different performance and cost characteristics for storing content. So, for example, a storage rule may identify one of the storage platform on which to store content based on the frequency with which the content has been requested. As another example, the storage rule may consider one or both of the age of the content and the frequency with which the content is accessed. If, for example, content is older than a year (or other predetermined time period) and fails to meet a certain threshold of requests, the storage rule may identify a storage platform that performs a primarily archival function. If, on the other hand, the content is newer or in high demand, the storage rule may identify a faster or more readily accessible storage platform. In still other examples, storage rules may be based on availability of network resources including, without limitation, storage capacity of the available storage platforms, computational speed of the available storage platforms, and bandwidth availability for retrieving content from the storage platforms. The storage rules may be applied, for example, on data stored in the metadata store 114. Such data may include, among other things, characteristics of currently stored content (e.g., file size, file type, creation date), frequency data for retrieval of the content, a date or timestamp indicating the most recent access of the content, and the like. The storage rules may also be applied when content is first being provided for storage.

After or in conjunction with transmitting the received content to the identified system, a metadata record is generated (operation 210). The metadata record generally includes a unique object identifier assigned to the content and a means for locating the content, such as a storage system identifier associated with the storage system in which the received content is stored. The generated metadata record may further include additional data corresponding to one or more of the received content, the content provider, the storage system on which the content is stored, and details regarding access and distribution of the content. Once generated, the metadata record is transmitted and stored in a metadata store (operation 212), such as the metadata store 114 of FIG. 1. As indicated in FIG. 2, the general process of ingesting content and generating a metadata record corresponding to the ingested content may be repeated for each piece of new content received from the content provider 120.

The metadata store 114 functions as a listing of content available across all storage platforms and may further include characteristics of the content related to the content itself or access of the content. In certain implementations, the metadata store 114 provides a consolidated content listing even if the storage platforms for content included in the metadata store 114 are not interoperable. Accordingly, a content provider, CDN operator, or other entity may access and use the records maintained in the metadata store 114 to provide an overview of available content. In contrast, conventional systems including multiple storage platforms often require accessing each storage platform separately in order to access data corresponding to stored content. The consolidation of content information in the metadata store 114 is accomplished, in part, by assigning unique object identifiers to each piece of stored content. More specifically, each piece of stored content is assigned a unique object identifier that is global and remains assigned to the content regardless of where the content is stored or whether the content is migrated between storage platforms.

Figure 3:
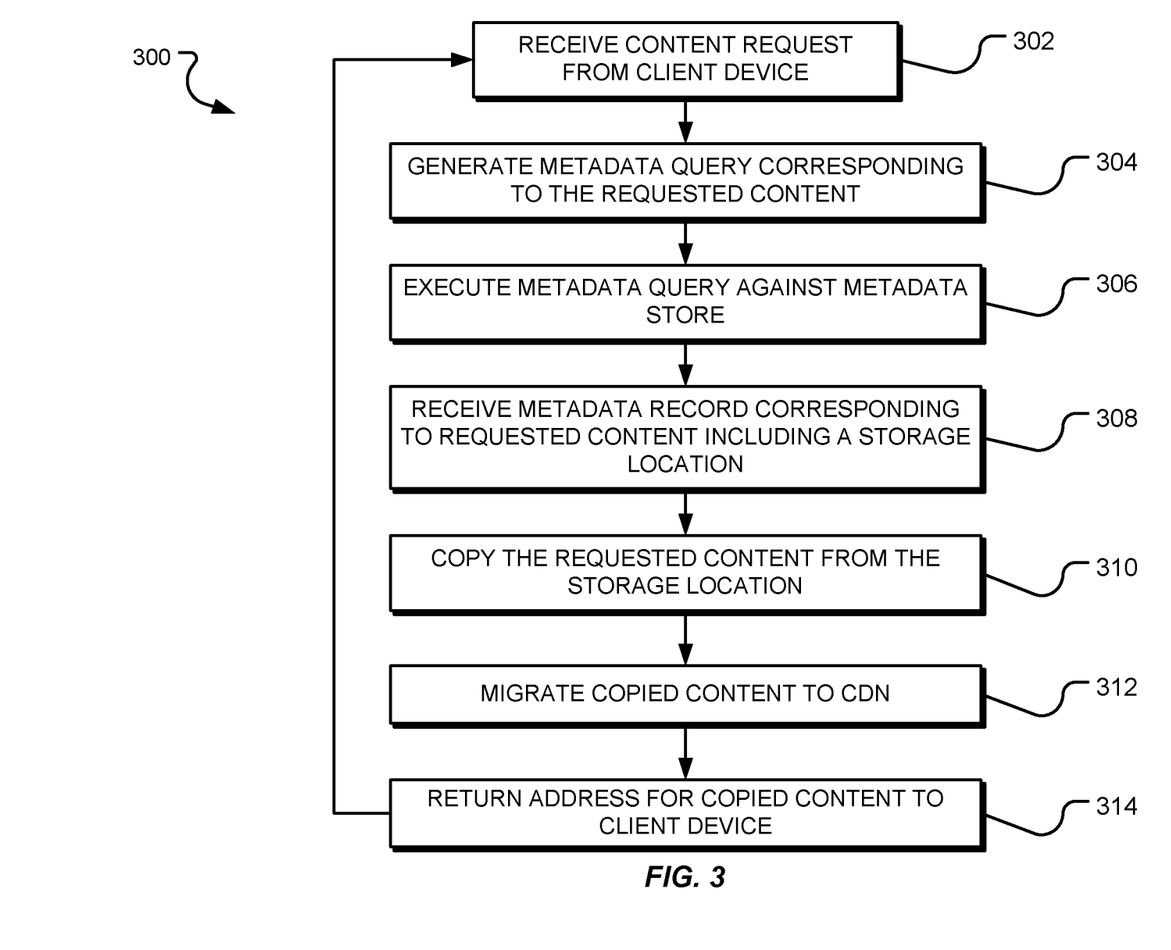
FIG. 3 is a flowchart illustrating a method, or combination of methods, for retrieving content for distribution by a content distribution network.

FIG. 3 is a flowchart illustrating a method 300, or combination of methods, for retrieving content including various operations that may be performed by one or more computing systems, such as the computing system 400 shown in FIG. 4. Referring to the system 100 of FIG. 1, the method 300 illustrated in FIG. 3 generally relates to retrieval of content from the first storage system 122, the second storage system 124, or any similar storage system in communication with the CDN 102 in response to a request received from the client device 108.

The method involves receiving a request for content from the client device 108 (operation 302). As previously discussed in the context of FIG. 1, receiving a request for content may include receiving a resolution request from the client device 108 at a DNS server 110. The DNS server 110 may determine that the request corresponds to content stored on the CDN 102 and forward the request to an authoritative DNS name server or similar resolver of the CDN 102. The authoritative DNS name server or other computing device of the CDN 102 then determines if the requested content is stored within the CDN 102, such as at an edge server of the CDN 102. If so, the corresponding IP address of the edge server is returned to the client device 108 such that the client device 108 may connect to and retrieve the requested content from the edge server.

If a copy of the content is not yet stored within the CDN 102, a metadata query may be generated corresponding to the requested content (operation 304). In certain implementations, the metadata query may include an object identifier or similar unique identifier assigned to the requested content such that any metadata records corresponding to the content can be readily retrieved by performing a lookup using the unique identifier. Once generated, the metadata query is executed against a metadata store, such as the metadata store 114 of FIG. 1 (operation 306). As previously noted in the context of FIG. 2, the metadata store 114 consolidates content information corresponding to content maintained in storage platforms associated with the CDN 102 and, as a result, provides a centralized collection of content information that may be consulted to locate stored content or to make storage-related decisions. Such a centralized information source is both efficient and enables storage management regardless of whether particular storage platforms are interoperable or provide similar information in compatible formats.

In response to executing the metadata query, the corresponding metadata record is received (operation 308). The metadata record generally includes a storage location or identifier corresponding to a storage location from which the requested content can be retrieved. For example, the metadata record may include a storage identifier corresponding to one of the first storage system 122 and the second storage system 124 of FIG. 1.

The content is then copied from the storage location (operation 310) and the copied content is then stored within the CDN 102 (operation 312). Storage of the copied content within the CDN 102 may further include identifying one of a plurality of computing devices of the CDN 102, such as an edge server, on which to store the copy of the requested content. In certain implementations, identifying the computing device of the CDN 102 on which to store the copied content may include analyzing geographic proximity of the computing device to the DNS server 110 or client device 108, network load, network topology, and other factors that may be considered in determining an efficient location to store the content. Once the content is copied to the CDN, an address for the copied content, such as an IP address, is returned to the client device 108 such that the client device 108 may connect to the corresponding computing device of the CDN 102 and retrieve the copied content.

Referring to FIG. 4, a schematic illustration of an example computing system 400 having one or more computing units that may implement various systems and methods discussed herein is provided. It will be appreciated that specific implementations of these devices may be of differing possible specific computing architectures not all of which are specifically discussed herein but will be understood by those of ordinary skill in the art.

The computer system 400 may be a computing system capable of executing a computer program product to execute a computer process. Data and program files may be input to computer system 400, which reads the files and executes the programs therein. Some of the elements of the computer system 400 are shown in FIG. 4, including one or more hardware processors 402, one or more data storage devices 404, one or more memory devices 408, and/or one or more ports 408-412. Additionally, other elements that will be recognized by those skilled in the art may be included in the computing system 400 but are not explicitly depicted in FIG. 4 or discussed further herein. Various elements of the computer system 400 may communicate with one another by way of one or more communication buses, point-to-point communication paths, or other communication means not explicitly depicted in FIG. 4.

The processor 402 may include, for example, a central processing unit (CPU), a microprocessor, a microcontroller, a digital signal processor (DSP), and/or one or more internal levels of cache. There may be one or more processors 402, such that the processor 402 comprises a single central-processing unit, or a plurality of processing units capable of executing instructions and performing operations in parallel with each other, commonly referred to as a parallel processing environment.

The computer system 400 may be a conventional computer, a distributed computer, or any other type of computer, such as one or more external computers made available via a cloud computing architecture. The presently described technology is optionally implemented in software stored on data storage device(s) 404, stored on memory device(s) 406, and/or communicated via one or more of the ports 408-412, thereby transforming the computer system 400 in FIG. 4 to a special purpose machine for implementing the operations described herein. Examples of the computer system 400 include personal computers, terminals, workstations, mobile phones, tablets, laptops, personal computers, multimedia consoles, gaming consoles, set top boxes, and the like.

One or more data storage devices 404 may include any non-volatile data storage device capable of storing data generated or employed within the computing system 400, such as computer executable instructions for performing a computer process, which may include instructions of both application programs and an operating system (OS) that manages the various components of the computing system 400. Data storage devices 404 may include, without limitation, magnetic disk drives, optical disk drives, solid state drives (SSDs), flash drives, and the like. Data storage devices 404 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. One or more memory devices 406 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 404 and/or the memory devices 406, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 400 includes one or more ports, such as an input/output (I/O) port 408, a communication port 410, and a sub-systems port 412, for communicating with other computing, network, or vehicle devices. It will be appreciated that the ports 408-412 may be combined or separate and that more or fewer ports may be included in the computer system 400.

The I/O port 408 may be connected to an I/O device, or other device, by which information is input to or output from the computing system 400. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 400 via the I/O port 408. Similarly, the output devices may convert electrical signals received from the computing system 400 via the I/O port 408 into signals that may be sensed as output by a human, such as sound, light, and/or touch. The input device may be an alphanumeric input device, including alphanumeric and other keys for communicating information and/or command selections to the processor 402 via the I/O port 408. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 400 via the I/O port 408. For example, an electrical signal generated within the computing system 400 may be converted to another type of signal, and/or vice-versa. In one implementation, the environment transducer devices sense characteristics or aspects of an environment local to or remote from the computing device 400, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example the computing device 400, such as, physical movement of some object (e.g., a mechanical actuator), heating or cooling of a substance, adding a chemical substance, and/or the like.

In one implementation, a communication port 410 is connected to a network by way of which the computer system 400 may receive network data useful in executing the methods and systems set out herein as well as transmitting information and network configuration changes determined thereby. Stated differently, the communication port 410 connects the computer system 400 to one or more communication interface devices configured to transmit and/or receive information between the computing system 400 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via communication port 410 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 410 may communicate with an antenna for electromagnetic signal transmission and/or reception.

The computer system 400 may include a sub-systems port 412 for communicating with one or more systems related to a vehicle to control an operation of the vehicle and/or exchange information between the computer system 400 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

The system set forth in FIG. 4 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended thereto.

We claim:

1. A method of storing content comprising:
    receiving the content from a content provider at an ingest server, the ingest server communicatively coupled to each of a content delivery network (CDN) and a plurality of storage systems;
    identifying a first storage system of the plurality of storage systems for storing the content received from a content provider by applying one or more first storage rules to data corresponding to the content, the content provider, and the plurality of storage systems;
    initiating transfer of the content to the first storage system;
    adding a metadata record to a metadata collection, the metadata record including a first storage system identifier assigned to the first storage system and an object identifier assigned to the content;
    causing the content to be migrated to a second storage system of the plurality of storage systems, wherein the second storage system is not interoperable with the first storage system; and
    updating the metadata record with a second storage system identifier assigned to the second storage system but leaving the object identifier for the content unchanged.

2. The method of claim 1, wherein the first storage system is a third-party cloud storage system, and the ingest server applies the one or more first rules to the content, and the ingest server initiates transfer of the content to the first storage system.

3. The method of claim 1, wherein updating the metadata record comprises at least one of creating the metadata record or modifying the metadata record.

4. The method of claim 1, wherein the second storage system has different performance characteristics from the first storage system, and initiating migration of the content comprises identifying the second storage system by applying one or more second storage rules to second data corresponding to the content, the content provider, and the plurality of storage systems.

5. The method of claim 4, wherein the second data corresponds, at least in part, to the content and the second data is obtained, at least in part, from the metadata collection.

6. The method of claim 1, wherein:
    the one or more first storage rules define logical tests that may be applied to one or more of content data, content provider data, and storage system data to generate a rule result, the rule result identifying a storage system of the plurality of storage systems;
    identifying the first storage system comprises obtaining the data corresponding to at least one of the content, the content provider, and the first storage system; and
    obtaining a rule result for the content by applying the first storage rules to the data, the rule result for the content identifying the first storage system.

7. The method of claim 1, wherein the one or more first storage rules are based on one or more of:
    a size of the content;
    a type of the content;
    a frequency with which the content is requested;
    a frequency with which the content is modified;
    an age of the content;
    a preference of the content provider;
    one or more first terms of a first service agreement for making the content available over a content delivery network (CDN);
    one or more second terms of one or more second service agreements for storing content on the plurality of storage systems;
    a speed for retrieving the content once stored;
    a storage cost for storing the content; and
    a level of security applied to the content once stored.

8. The method of claim 1 further comprising, in response to receiving a metadata request including an object identifier corresponding to a piece of stored content, providing one or more metadata records of the metadata collection associated with the object identifier.

9. The method of claim 1, wherein initiating storage of the content on the first storage system comprises initiating storage of a first portion of the content, the method further comprising:

identifying the second file storage system for storing the content by applying one or more second storage rules to the content; and initiating storage of a second portion of the content on the second storage system.

10. The method of claim 9, wherein the first portion of the content includes one or more transport segments and the second portion of the content includes a manifest file including entries for the one or more transport segments.

11. A method of serving content comprising:

receiving a request from a client device for requested content stored in a storage system of a plurality of storage systems in communication with a content distribution network (CDN), the request including a requested object identifier for the requested content;

performing a lookup in a metadata collection for a storage system identifier using the requested object identifier, the metadata collection including a plurality of metadata records for content stored in the plurality of storage systems, a first metadata record of the plurality of metadata records including each of the requested object identifier and the storage system identifier for a first storage system on which the requested content is stored;

locating the requested content using the storage system identifier;

copying the requested content to the CDN;

serving the requested content to the client device from the CDN;

updating access information for the requested content stored in the first metadata record, the access information including at least one of a number of times the requested content has been requested and a time of a most recent request for the requested content; and causing the content to be migrated from the first storage system to a second storage system of the plurality of storage systems based on the updated access information in the first metadata record.

12. The method of claim 11, wherein copying the requested content to the CDN comprises creating a cache of the requested content at an edge device of the CDN, and serving the requested content to the client device comprises serving the client device from the cache.

13. The method of claim 12, further comprising:

receiving a second request for the requested content from a second client device; and serving the requested content to the second client device from the cache.

14. The method of claim 11, wherein the requested content includes a plurality of transport segments and a manifest file including entries for each of the plurality of transport segments, and serving the requested content from the CDN comprises:

serving the manifest file to the client device in response to the request for the requested content; and serving one or more of the plurality of transport segments in response to one or more subsequent requests for the transport segments received from the client device.

15. The method of claim 11, further comprising:

receiving a metadata request from a second client device, the metadata request including the requested object identifier;

retrieving the metadata record corresponding to the requested content from the metadata collection; and transmitting data contained within the metadata record to the second client device.

16. The method of claim 11, wherein the storage system is a third-party cloud storage system.

17. The method of claim 16, wherein content stored on the storage system is accessible through a web server, the method further comprising:

generating a third-party cloud storage system request for the requested content;

submitting the third-party cloud storage system request to the web server; and obtaining a copy of the requested content from the third-party cloud storage system.

18. A system for storing content comprising:

a metadata collection for storing metadata records, each metadata record corresponding to stored content maintained in at least one of a plurality of storage systems; and an ingress server communicatively coupled to the metadata collection and the plurality of storage systems, the ingress server comprising a processor and one or more non-transitory tangible computer-readable storage media storing computer-executable instructions that, when executed by the processor, cause the ingress server to:

receive the content from a content provider;

identify a first storage system of a plurality of storage systems on which to store content by applying one or more storage rules to at least one of the content and metadata records of the metadata collection;

initiate transfer of the content to the first storage system;

update the metadata collection to include a metadata record for the content, the metadata record including a storage system identifier corresponding to the first storage system and an object identifier corresponding to the content;

cause the content to be migrated to a second storage system of the plurality of storage systems, wherein the second storage system is not interoperable with the first storage system; and update the metadata record with a second storage system identifier assigned to the second storage system but leaving the object identifier for the content unchanged.

19. A system for serving content comprising:

a content delivery server of a content delivery network (CDN), the content delivery server comprising a processor and one or more non-transitory tangible computer-readable storage media storing computer-executable instructions that, when executed by the processor, cause the content delivery server to:

receive a request for content stored on a storage system of a plurality of storage systems;

obtain a storage system identifier from a first metadata record of a metadata collection, the metadata collection including one or more metadata records corresponding to content stored on the plurality of storage systems, the storage system identifier corresponding to a first storage system on which the content is stored;

serve the stored content based on the storage system identifier, wherein serving the stored content comprises at least one of retrieving the stored content from the first storage system and serving a cached version of the stored content maintained within the CDN;

serve the requested content to the client device from the CDN;

update access information for the requested content stored in the first metadata record, the access information including at least one of a number of times the requested content has been requested and a time of a most recent request for the requested content; and cause the content to be migrated from the first storage system to a second storage system of the plurality of storage systems based on the updated access information in the first metadata record.

20. The system of claim 18, further comprising a web server communicatively coupled to each of the content delivery server and the metadata collection, the web server configured to:

receive a storage system identifier request from the content delivery server, the storage identifier request including an object identifier corresponding to the stored content;

identify the first storage system identifier by performing a look up in the metadata collection using the object identifier; and transmit the storage system identifier to the content delivery server.

21. The method of claim 1, wherein the data corresponding to the content comprises information indicating a number of times the content has been requested, the method further comprising:

receiving a request for the content; and updating the information indicating the number of times the content has been requested;

wherein causing the content to be migrated is based on the updated information indicating the number of times the content has been requested.

\* \* \* \* \*